US006547662B2

United States Patent
Yamada (10) Patent No.: US 6,547,662 B2
(45) Date of Patent: Apr. 15, 2003

(54) GAME MACHINE, METHOD OF CONTROLLING OPERATION OF THE GAME MACHINE, AND COMPUTER READABLE MEDIUM HAVING RECORDED THEREON OPERATION CONTROL PROGRAM FOR CONTROLLING THE GAME MACHINE

(75) Inventor: Nobuhiro Yamada, Tokyo (JP)

(73) Assignee: Konami Corporation, Tokyo (JP)

( * ) Notice: Subject to any disclaimer, the term of this patent is extended or adjusted under 35 U.S.C. 154(b) by 4 days.

(21) Appl. No.: 09/880,841

(22) Filed: Jun. 15, 2001

(65) Prior Publication Data

US 2002/0002071 A1 Jan. 3, 2002

(30) Foreign Application Priority Data

Jun. 28, 2000 (JP) .................................. 2000-194015

(51) Int. Cl.⁷ .................................................. A63F 9/24
(52) U.S. Cl. .......................... 463/11; 463/43; 273/292
(58) Field of Search ............................ 463/11, 13, 43, 463/40, 44–29; 273/269, 292, 293, 308

(56) References Cited

U.S. PATENT DOCUMENTS

| 5,163,688 A | | 11/1992 | Simms |
| 5,662,332 A | | 9/1997 | Garfield |
| 5,741,184 A | * | 4/1998 | Takemoto et al. ............ 463/43 |
| 5,954,332 A | | 9/1999 | Mero et al. |

FOREIGN PATENT DOCUMENTS

| JP | 11-33237 AA | 2/1999 |
| JP | 2000-157747 A | 6/2000 |
| TW | 375061 | 11/1999 |

* cited by examiner

Primary Examiner—Chen-Wen Jiang
(74) Attorney, Agent, or Firm—Sughrue Mion, PLLC (57) ABSTRACT

To suppress monotony experienced while playing a card game, a CPU (30) loads card information items recorded in a cassette (200) into a baggage region (51), and then, only card information item/items assigned a read enable flag of "1" from among the card information items loaded in the baggage region (51) is/are loaded into a deck region (52) which stores card information items capable of being laid in a game screen (step S1700).

18 Claims, 11 Drawing Sheets

| | | | 1 | 2 | 3 | 4 | 5 | ........ | 1000 |
|---|---|---|---|---|---|---|---|---|---|
| CARD NO. | | | | | | | | | |
| CARD NAME | | | a | b | c | d | e | ........ | f |
| IMAGE INFORMATION | | | A | B | C | D | E | ........ | F |
| FIELD | NORMAL | OFFENCE | 1500 | 2400 | 920 | 2000 | 1810 | ........ | 1300 |
| | | DEFENCE | 1200 | 2000 | 1830 | 1530 | 1530 | ........ | 1500 |
| | FOREST | OFFENCE | 1760 | 2640 | 820 | 1280 | 2000 | ........ | 1690 |
| | | DEFENCE | 1320 | 2200 | 1930 | 1730 | 1530 | ........ | 2015 |
| | WILDERNESS | OFFENCE | 2080 | 2400 | 828 | 1242 | 1800 | ........ | 1300 |
| | | DEFENCE | 1560 | 2000 | 1737 | 1737 | 1377 | ........ | 1560 |
| | MOUNTAIN | OFFENCE | 1440 | 3120 | 800 | 1242 | 1800 | ........ | 1300 |
| | | DEFENCE | 1080 | 2600 | 1737 | 1727 | 1377 | ........ | 1550 |
| | GREEN FIELD | OFFENCE | 1760 | 2840 | 825 | 1242 | 1800 | ........ | 1430 |
| | | DEFENCE | 1320 | 2200 | 1737 | 1737 | 1377 | ........ | 1705 |
| | OCEAN | OFFENCE | 1120 | 2640 | 828 | 1242 | 1800 | ........ | 910 |
| | | DEFENCE | 840 | 2200 | 1737 | 1737 | 1377 | ........ | 1085 |
| | DARKNESS | OFFENCE | 1400 | 2400 | 1200 | 1800 | 2500 | ........ | 1760 |
| | | DEFENCE | 1200 | 2000 | 2500 | 2500 | 2000 | ........ | 1550 |
| READ ENABLE FLAG | | | 1 | 1 | 0 | 1 | 0 | ........ | n |

(BATTLE PROCESSING)

S1500: HAS "OFFENSE" OR "DEFENCE" BEEN SELECTED IN CONNECTION WITH ALL CARDS LAID IN FIELD?

S1510: SELECT "OFFENSE" OR "DEFENSE" IN CONNECTION WITH CARDS FOR WHICH SELECTION HAS NOT BEEN MADE

S1520: IF "OFFENSE" HAS BEEN SELECTED, PERFORM "GAME OUTCOME DETERMINATION PROCESSING"

FIG. 15

| CASE | DETAILS OF PROCESSING |
|---|---|
| "OFFENSE" VS. "DEFENCE" | · SUBTRACT LIFE POINTS EQUAL TO DIFFERENCE IN OFFENSE POWER INDICES OF BOTH CARDS FROM LOSER'S LIFE POINT TOTAL, AND CAUSE LOSER'S CARD TO DISAPPEAR FROM LOSER'S SCREEN |
| "OFFENSE" VS. "DEFENCE," "OFFENSE" HAS WON A GAME | · CAUSE LOSER'S CARD TO DISAPPEAR FROM LOSER'S SCREEN |
| "OFFENSE" VS. "DEFENCE," "DEFENCE" HAS WON A GAME | · SUBTRACT LIFE POINTS EQUAL TO A DIFFERENCE BETWEEN POWER INDICES OF BOTH CARDS |
| "OFFENSE" VS. "NO CARD IN FIELD" | · SUBTRACT LIFE POINTS EQUAL TO OFFENSE POWER INDEX FROM LIFE POINT TOTAL OF THE PLAYER WHO HAS LAID NO CARD IN FIELD |

| CARD NO. | CARD NAME | CASSETTE (1) | CASSETTE (2) | CASSETTE (3) |
|---|---|---|---|---|
| 1 | a | ○ | × | × |
| 2 | b | ○ | ○ | × |
| 3 | c | × | ○ | × |
| 4 | d | ○ | ○ | × |
| 5 | e | × | ○ | ○ |
| ⋮ | ⋮ | ⋮ | ⋮ | ⋮ |
| 1000 | f | × | × | ○ |

FIG. 18

| CARD NO. | CARD NAME | FIRST READ ENABLE FLAG | SECOND READ ENABLE FLAG | ............ |
|---|---|---|---|---|
| 1 | a | 1 | 1 | ⋮ |
| 2 | b | 1 | 1 | ⋮ |
| 3 | c | 0 | 1 | ⋮ |
| 4 | d | 0 | 0 | ⋮ |
| 5 | e | 0 | 0 | ⋮ |
| ⋮ | ⋮ | ⋮ | ⋮ | ⋮ |
| 1000 | f | 0 | 0 | ⋮ |

GAME MACHINE, METHOD OF CONTROLLING OPERATION OF THE GAME MACHINE, AND COMPUTER READABLE MEDIUM HAVING RECORDED THEREON OPERATION CONTROL PROGRAM FOR CONTROLLING THE GAME MACHINE

BACKGROUND OF THE INVENTION

1. Field of the Invention

The present invention relates to a game machine for enabling a player and an opponent to play a match by way of laying their cards on a game screen, a method of controlling the operation of the game machine, and a recording medium, such as a computer readable medium, having recorded thereon an operation control program for controlling the game machine.

The present application is based on Japanese Patent Application No. 2000-194015, which is incorporated herein by reference.

2. Description of the Related Art

There has been in vogue a game in which a player and an opponent play a match by way of laying their cards in a predetermined area on a display section of a game machine by way of actuating operation buttons. In a game machine of this type, card information items concerning cards recorded in an external recording medium, such as a cassette, are read, and the thus-read card information items are loaded in a predetermined area of RAM (i.e., Random Access Memory) provided in the game machine.

A game is played as follows. Specifically, certain card information items which have been selected from among the thus-loaded card information items by way of selection operation or in accordance with predetermined procedures are further loaded in a certain area on the RAM. The card information items loaded into the certain area can be laid down in a predetermined area of the game display section. The player and the opponent play a match by way of laying down their cards, thus having a showdown. In other words, the player and the opponent play a match by way of loading, in the certain area, card information items pertaining to cards to be laid down.

A method of controlling operation of the game machine of the above type enables players to play a match through use of all card information items recorded in an external recording medium, such as a cassette. Undeniably, a person who has become acclimated to a game of this type to a certain degree finds the game monotonous, and there has been desire for an improvement attractiveness of a game through any contrivance.

SUMMARY OF THE INVENTION

The present invention has been conceived to solve the above-described drawbacks of the game machine of the related art. Thus, the present invention is aimed at providing a game machine which avoids the monotony of a game of the type. Further, the present invention is aimed at providing a method of controlling the operation of the game machine, and a recording medium, such as a computer readable medium, having recorded thereon an operation control program for controlling the game machine.

To achieve the above object, according to a first aspect of the present invention, there is provided a game machine which enables a player and an opponent to play a match by laying their cards on a game screen. The game machine comprises:

a first reading device which loads, into a first memory area, card information items pertaining to a plurality of cards recorded in an external computer readable medium; and a second reading device which loads, into a second memory area which stores card information items capable of being laid on the game screen, only at least one of the card information items for which loading is allowed from among the card information items loaded into the first memory area.

In accordance with the first aspect of the present invention, only the card information item/items, for which loading is allowed from among the card information items recorded in the external computer readable medium, is/are loaded into the second memory area. The thus-loaded card information item(s) can be used for a game. A player can play a game with restrictions imposed on the number of available card information item(s) as compared with the case of a game according to the related art. Correspondingly, the player can enjoy playing a game without feeling monotony.

Further, according to a second aspect of the present invention, preferably, information concerning the at least one of the card information items for which loading is allowed is recorded in the external computer readable medium. As a result thereof, setting of the information becomes easy.

Further, according to a third aspect of the present invention, preferably, the information concerning the at least one of the card information items for which loading is allowed varies among a plurality of external computer readable mediums. In connection with each of a plurality of external storage mediums, a player can play a game with use of different available card information item(s). Thus, the player can enjoy playing a game without feeling monotony.

Further, according to a fourth aspect of the present invention, preferably, the information concerning the at least one of the card information items for which loading is allowed is set in a plurality of patterns in connection with the plurality of cards within the external computer readable medium, wherein the second reading device includes a reading section which loads, into a second memory area which stores card information items capable of being laid on the game screen, only the at least one of the card information items for which loading is allowed from among the card information items loaded into the first memory area, with reference to a pattern selected in accordance with a predetermined rule. Hence, even when a certain single external computer readable medium is used, the player can play a game with different card information item(s) being available according to a selected pattern. Accordingly, the player can enjoy a game while feeling considerable relief from monotony.

Further, according to a fifth aspect of the present invention, preferably, the predetermined rule is to select a different pattern every time final winning of a game is achieved. Accordingly, the player can play a game with different available card information item(s) every time the number of final winnings increases.

Further, according to a sixth aspect of the present invention, preferably, the pattern employed when a different pattern is selected is set such that the number of at least one of card information items for which loading is allowed increases sequentially. Accordingly, the player can become enthusiastic about a game such that the number of final winnings is increased.

Further, according to a seventh aspect of the present invention, preferably, the game machine further comprises a selection pattern output device which outputs a pattern selected from among the plurality of patterns. Accordingly, a selected pattern can be easily ascertained.

Furthermore, to achieve the above object, according to an eighth aspect of the present invention, there is provided a method of controlling operation of a game machine which enables a player and an opponent to play a match by laying their cards on a game screen. In the method, card information items pertaining to a plurality of cards recorded in an external computer readable medium is first loaded into a first memory area. Then, only at least one of the card information items, for which loading is allowed, from among the card information items loaded into the first memory area, is loaded into a second memory area which stores card information items capable of being laid on the game screen.

In accordance with the eighth aspect of the present invention, only the card information item/items for which loading is allowed from among the card information items recorded in the external computer readable medium is/are loaded into the second memory area. Therefore, the thus-loaded card information item(s) can be used for a game. Accordingly, a player can play a game with restrictions imposed on the number of available card information item(s) as compared with the case of a game according to the related art. Correspondingly, the player can enjoy playing a game without feeling monotony.

Further, according to a ninth aspect of the present invention, preferably, the method of the eighth aspect further comprises the steps as follows. Information concerning the at least one of the card information items for which loading is allowed is set in a plurality of patterns in connection with the plurality of cards. With reference to a pattern selected in accordance with a predetermined rule, only the at least one of the card information items for which loading is allowed from among the card information items loaded into the first memory area is loaded into a second memory area which stores card information items capable of being laid on the game screen.

Hence, even when a certain single external computer readable medium is used, the player can play a game with different card information item(s) being available, according to a selected pattern. Accordingly, the player can enjoy a game with considerable relief from monotony.

Moreover, to achieve the above object, according to a tenth aspect of the present invention, there is provided a computer readable medium having recorded thereon an operation control program for controlling operation of a game machine which enables a player and an opponent to play a match by laying their cards on a game screen. The operation control program comprises:

a first processing routine for loading, into a first memory area, card information items pertaining to a plurality of cards recorded in an external computer readable medium; and a second processing routine for loading, into a second memory area which stores card information items capable of being laid on the game screen, only at least one of the card information items for which loading is allowed, from among the card information items loaded into the first memory area.

In accordance with the tenth aspect of the present invention, only the card information item/items, for which loading is allowed from among the card information items recorded in the external computer readable medium, is/are loaded into the second memory area. Therefore, the thus-loaded card information item(s) can be used for a game. Accordingly, a player can play a game with restrictions imposed on the number of available card information item(s) as compared with the case of a game according to the related art. Correspondingly, the player can enjoy playing a game without feeling monotony.

It should be noted that the aforementioned computer readable medium may include a recording medium which enables recording and reading of digital contents More specifically, such the computer readable medium includes, for example, a semiconductor recording medium such as a ROM (i.e., Read Only Memory), a semiconductor IC (i.e., Integrated Circuit), etc., an optical recording medium such as a DVD-ROM (i.e., Digital Versatile Disk-Read Only Memory), a CD-ROM (i.e., Compact Disc-Read Only Memory), etc., a magnetic recording medium such as a flexible disk etc., and a magneto-optical medium such as an MO (i.e., Magneto Optical Disk) etc.

BRIEF DESCRIPTION OF THE DRAWINGS

The above and other objects and advantages of the present invention will become more apparent by describing in detail preferred embodiments thereof with reference to the accompanying drawings, wherein.

DETAILED DESCRIPTION OF THE PREFERRED EMBODIMENTS

Preferred embodiments of the present invention now will be described hereinbelow with reference to the accompanying drawings. First, the "configuration" of a game machine according to an embodiment of the present invention will be described, and then, "general operations and the nature of a game" of this type will be described. Finally, the "principal feature of the present invention" will be described, thus facilitating comprehension of the present invention.

1. Configuration

Figure 1:
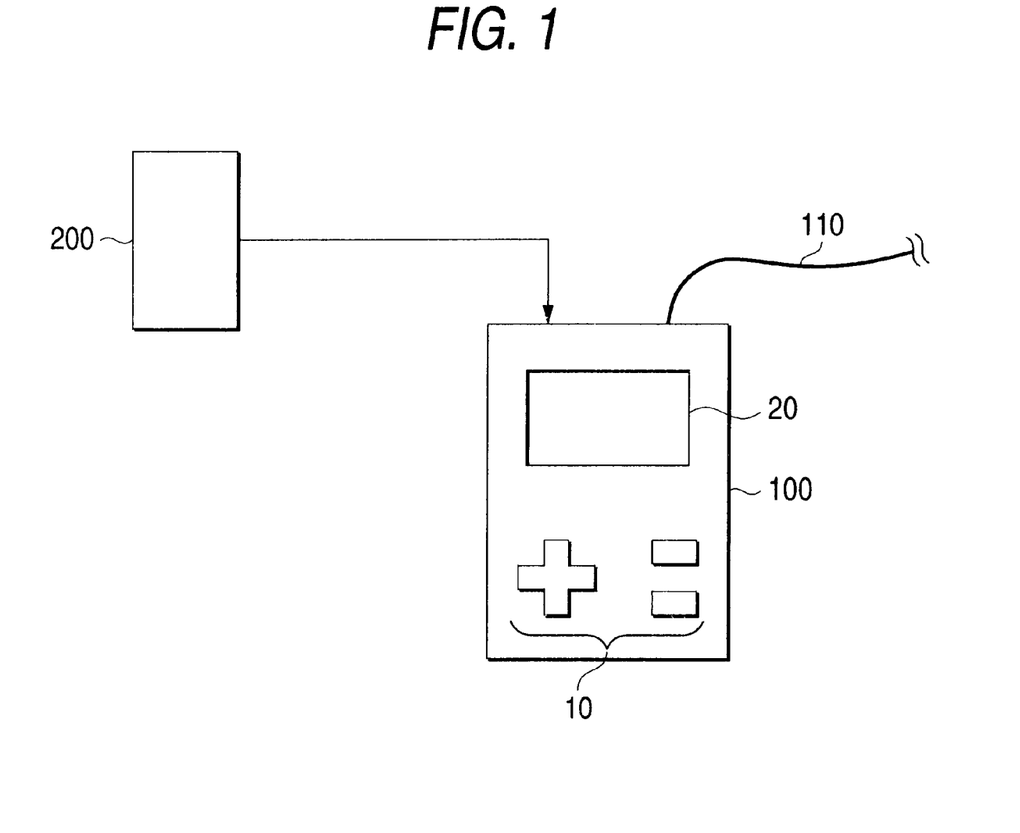
FIG. 1 is an external view of a game machine according to an embodiment of the present invention.

FIG. 1 is an external view of a game machine 100 according to an embodiment of the present invention. Control buttons 10 used for performing various operations and a display section 20 in which a game screen is to be displayed are provided on the front surface of the game machine 100. The game machine 100 is constructed so that a cassette 200 serving as an external recording medium, such as a computer readable medium, having recorded thereon an operation control program for executing a card game is removably attached to the game machine 100. The game machine 100 enables execution of a card game with a game machine (not shown) of the same type by way of a communications cable 110 while required information is exchanged therebetween.

As a matter of course, a player can play a match against the game machine 100 (i.e., a player can enjoy playing a card game alone). Thus, a player can select either a match against a human opponent or a match against the game machine 100. Although FIG. 1 shows a case where a cable method using the communications cable 110 is employed, exchange of desired information may be established in any form, such as ultrasonic vibration, infrared rays, or radio communication such as that via a radio wave.

Figure 2:
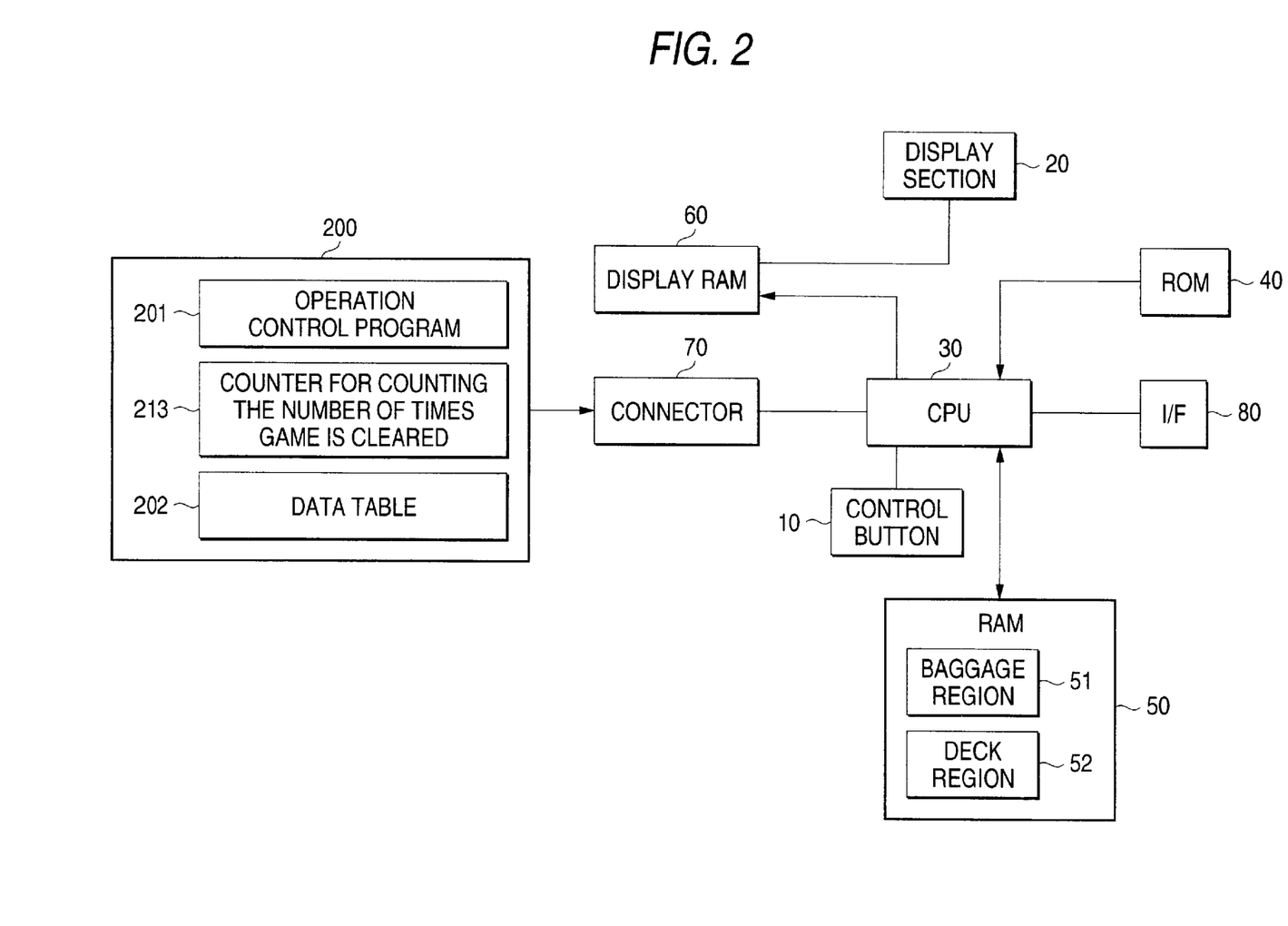
FIG. 2 is a block diagram of the game machine according to the embodiment.

FIG. 2 is a block diagram showing the game machine 100 and the cassette 200 removably attached to the game machine 100. The game machine 100 comprises control buttons 10 used for performing various operations; a display section 20 embodied by a liquid-crystal display; a CPU 30 which effects a primary control operation such as execution of a card game; ROM 40 for recording basic software used for activating the CPU 30; RAM 50 acting as a work area; RAM 60 for display purpose for storing display data to be displayed on the display section 20; a connector 70 for establishing electrical connection with the cassette 200; and an interface (I/F) 80 for establishing connection with the communications cable 110. A baggage region 51 (i.e., a first storage area) and a deck region 52 (i.e., a second storage area) are formed in the RAM 50.

An operation control program 201 for effecting a card game, a data table 202, and a counter 213 for counting the number of times a game is cleared; i.e., the number of final wins in a game, are recorded in the cassette 200.

Figure 3:
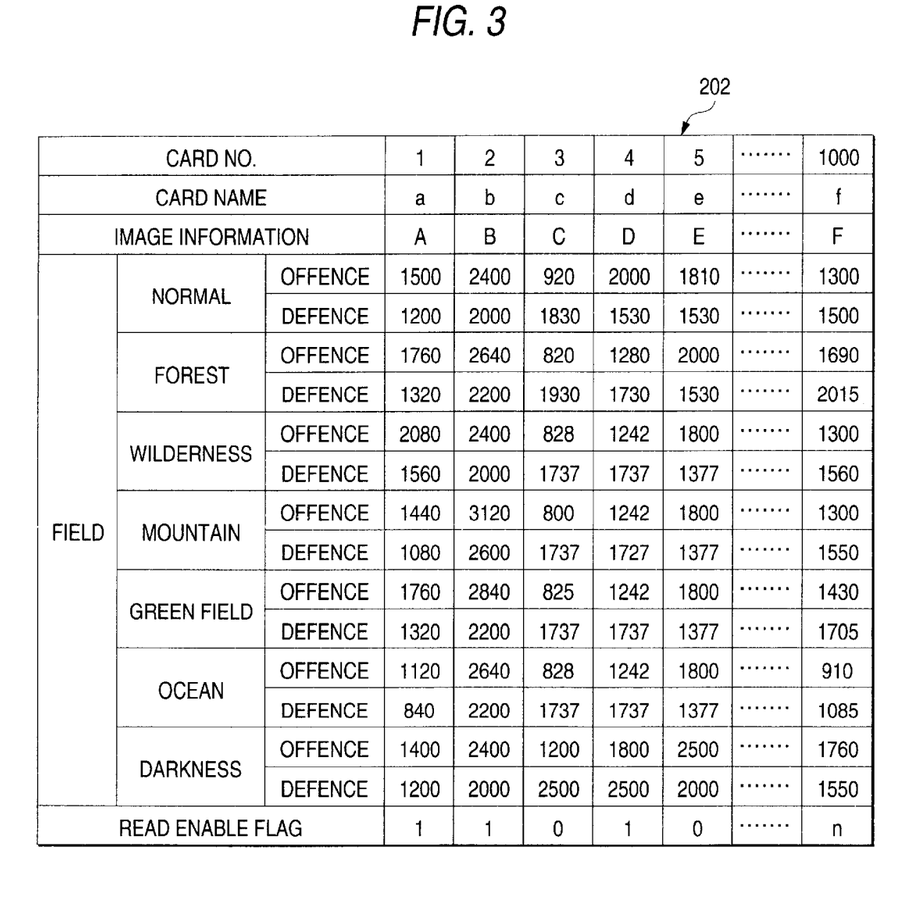
FIG. 3 is a descriptive view of a data table 202.

As shown in FIG. 3, a card number, a card name, image information which is display image data pertaining to a card, fields, and a read enable flag to be described later are stored in the data table 200 so as to be associated with one another. In this example, information about 1000 cards from Card Nos. 1 through 1000 (i.e., card information items) is stored in the data table 202. Here, the term "Field" means a game environment set in a card game. In this example, there are set seven types of fields; that is, "Normal," "Forest," "Wilderness," "Mountains," "Green Field," "Ocean," and "Darkness." Further, an "Offense" power index and a "Defense" power index are numerically set for each of the fields. An "Offense" power index is called an offense power index, and a "Defense" power index is called a defense power index. Details of a game using these power indices will be described later.

As can be seen from the data table 202, the offense power index of a certain card usually differs from the defense power index of the same card even in an is identical field. Further, the power indices of a certain card may change from field to field. In connection with image information, a character set for each card name appears. In this card game, the data table 202 is used when a player has selected either "ATTACK" or "DEFEND" in any one of the seven types of fields.

2. General Operations

When the cassette 200 is attached to the game machine 100, the CPU 30 is electrically connected to the connector 70, and a player actuates the control button 10 to thereby instruct resetting or turning on of power, the CPU 30 operates in accordance with basic software recorded in the ROM 40, reads the operation control program 201 from the cassette 200, and de-archives the thus-loaded operation control program 201 in the RAM 30. The CPU 30 reads a card number, a card name, image information, and a field stored in the data table 202 described with reference to FIG. 3 and stores the thus-read items into the baggage region 51 of the RAM 50.

Figure 4:
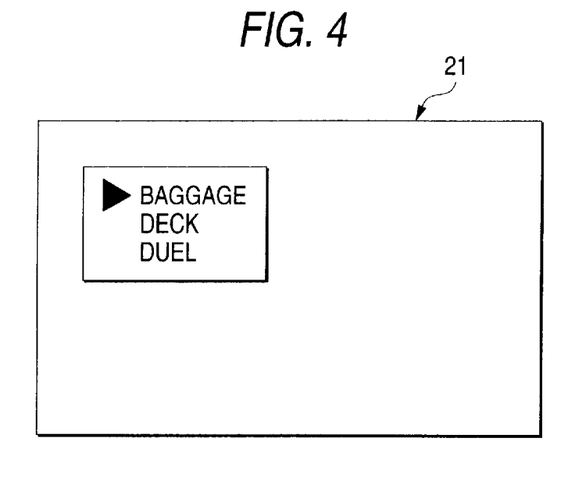
FIG. 4 is a descriptive view showing an example of a display screen appearing in a display area 21 on a display section 20.

The CPU 30 executes a game through use of the operation control program 201 de-archived in the RAM 30 and the card information items stored in the baggage region 51. "Baggage" is selected by actuation of the control button 10 while a guide menu shown in FIG. 4 is displayed in the display area 21, to thereby move a solid triangular mark (YES is selected in step S600). In step S602, a card number, a card name, and offense and defense power indices, which are assigned to each card stored in the baggage region 51, are displayed in the display area 21 (not shown).

When "Baggage" is not selected (NO is selected in step S600), a determination is made in step S604 as to whether or not "Deck" has been selected by actuation of the control button 10. When "Deck" has not been selected (NO is selected in step S604), processing proceeds to step S608. In contrast, when "Deck" has been selected (YES is selected in step S604), data sets pertaining to 600 cards, for example, are read from the baggage region 51 in step S606. The thus-read data sets are stored in the deck region 52. The characteristic of the present invention lies in these operations, and hence the operations will be described in detail later. The CPU 30 may read data sets in accordance with an instruction entered by way of the control button 10. The CPU 30 may automatically load card information about 600 cards.

Figure 6:
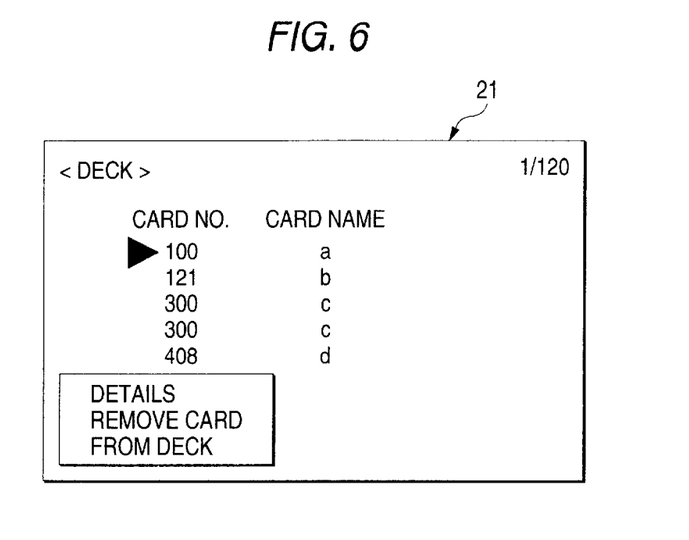
FIG. 6 is a descriptive view showing an example of a display screen appearing in a display area 21 on a display section 20.

Card information items stored in the deck region 52 are used for a card game. FIG. 6 shows a display screen appearing on the display area 21 immediately after a reading operation pertaining to step S606 has been performed. Card numbers and card names belonging to card information items stored in the deck region 52 appear in the center of the display area 21. A guidance menu appears in a position below the card numbers and the card names. When "Details" is selected by actuation of the control button 10, the CPU 30 displays detailed data pertaining to a card specified by the solid triangular mark; that is, offense and defense power indices of a character provided in the card in respective fields. When "Remove a card from the deck" is selected by actuation of the control button 10, the CPU 30 returns, to the baggage region 51, the card information item pertaining to the card specified by the solid triangular mark. "1/120" appearing at the upper right corner represents that the current screen is the first page of a total of 120 pages. The CPU 30 increments or decrements the page number by actuation of the control button 10, thereby sequentially providing, in the display area 21, five card numbers and their card names belonging to a currently-displayed page. Thus, 600 cards stored in the deck region 52 can be ascertained.

Figure 5:
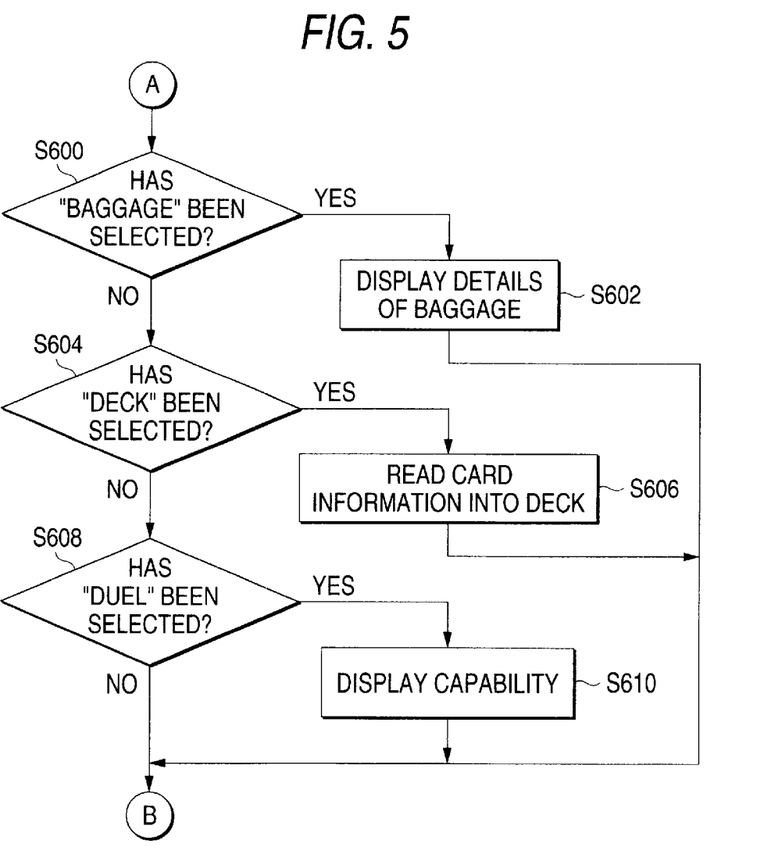
FIG. 5 is a flowchart for describing the operation of the game machine according to the embodiment.

When processing returns to step S608 shown in FIG. 5 and "Duel" is selectedby actuation of the control button 10 (YES is selected in step S608), the CPU 30 displays card information items pertaining to respective cards into the display area 21 (step S610). As mentioned above, details on "Baggage" are displayed by actuation of the control button 10, or card information items are stored in the deck region 52, thereby enabling display of detailed information, such as capability (power) of each card.

Figure 7:
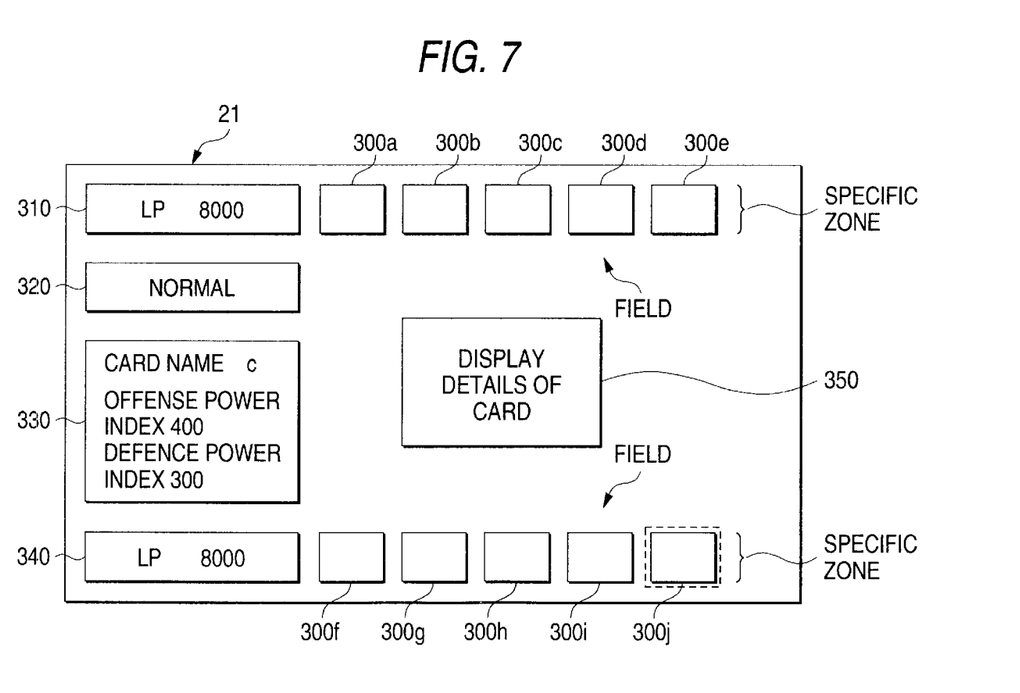
FIG. 7 is a descriptive view showing an example of a display screen appearing in a display area 21 on a display section 20.

Next, operations required for playing a real game will be described. After each of a player and an opponent has established a deck consisting of 600 cards, they enter battle. When having entered battle, the CPU 30 selects five cards from the player's deck and from the opponent's deck by lottery. The thus-selected cards are delivered to a specific zone within the display area 21 while remaining face down (FIG. 7). The thus-delivered cards are called a "hand." The CPU 30 arranges the player's hand into a specific zone located below the display area 21 (i.e., 300f through 300j) and the opponent's hand into another specific zone located above the display area 21 (300a through 300e).

The CPU 30 displays a life point total (8,000 points in this embodiment) assigned to the player, in a lower left section (340) within the display area 21. Similarly, a life point total (8,000 points in this embodiment) assigned to the opponent are displayed in an upper left section (310) within the display area 31. The CPU 30 indicates information about a field at that point in a section (320) located at a slightly upper left point within the display area 21. In the example shown in FIG. 7, "NORMAL" is displayed in the section (320). In this state, the player selects one card from his hand by actuation of the control button 10. The CPU 30 displays the thus-selected card in a conspicuous manner by enclosing the card with dotted lines. Image information pertaining to the selected card is displayed in a center section (350) of the display area 21. Further, detailed information is displayed in a left center section (330) of the display area 21. The detailed information displayed in the left center section 330 includes a card name and offense and defense power indices.

The embodiment shown in FIG. 7 is intended to represent that the player selects the rightmost card 300j from the five cards in his hand. The name of this card is "c," and the card has an offense power index of "400" and a defense power index of "300." The player can ascertain information about his card by actuation of the control button 10 but cannot see information about the opponent's card at all.

Figure 8:
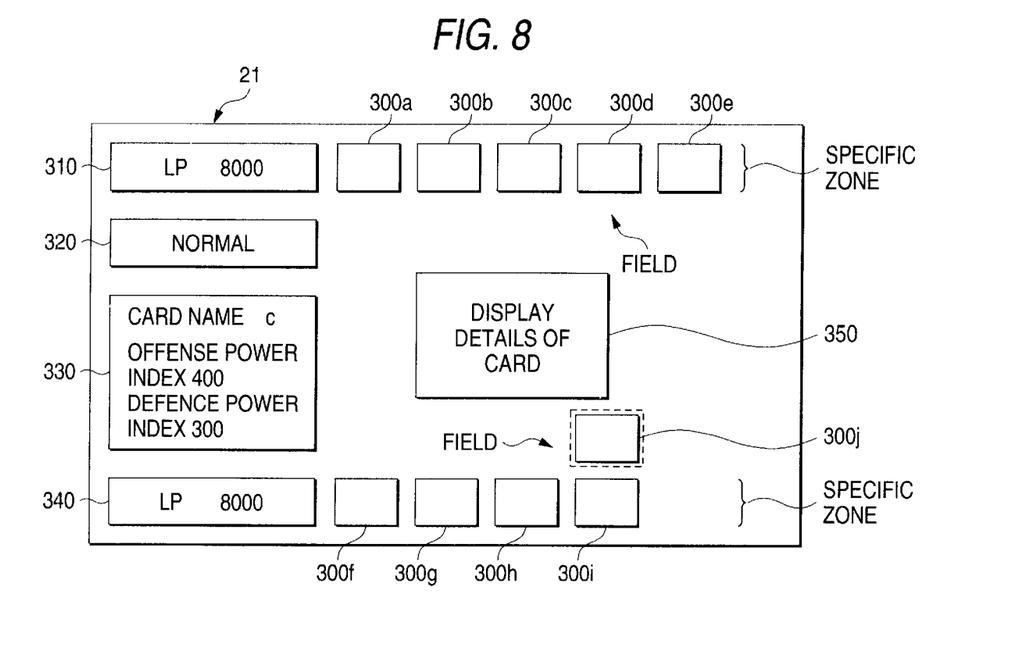
FIG. 8 is a descriptive view showing an example of a display screen appearing in a display area 21 on a display section 20.

As shown in FIG. 8, the card selected through actuation of the control button 10 is instructed to be laid in an area called "Field" located at the center of the display area 31. In response to this instruction, the CPU 30 displays the thus-selected card in the field in a conspicuous manner by enclosing the card with dotted lines. FIG. 8 is a display example when the player has selected the card 300j and laid the card 300j in the field. The CPU 30 displays, in the area 330, detailed information about the card 300j laid down, and, in an area 350, image information about the card 300j. As a matter of course, the opponent cannot see information about the card laid in the field.

Figure 9:
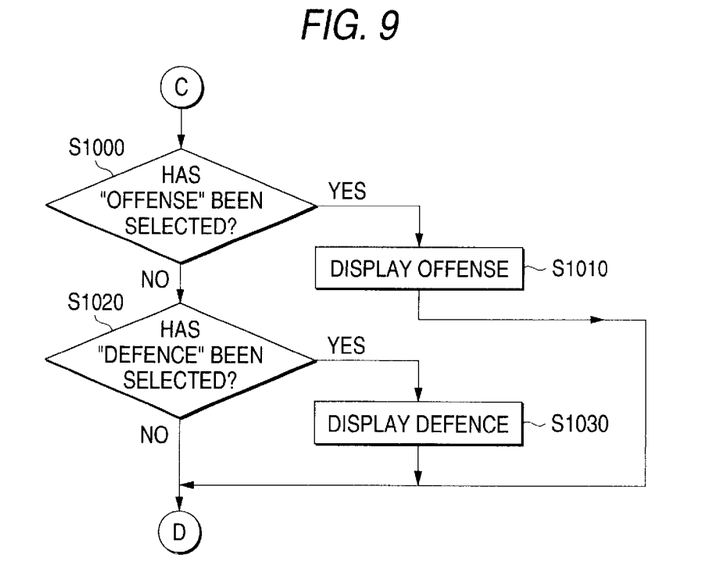
FIG. 9 is a flowchart for describing the operation of the game machine according to the embodiment.
Figure 10:
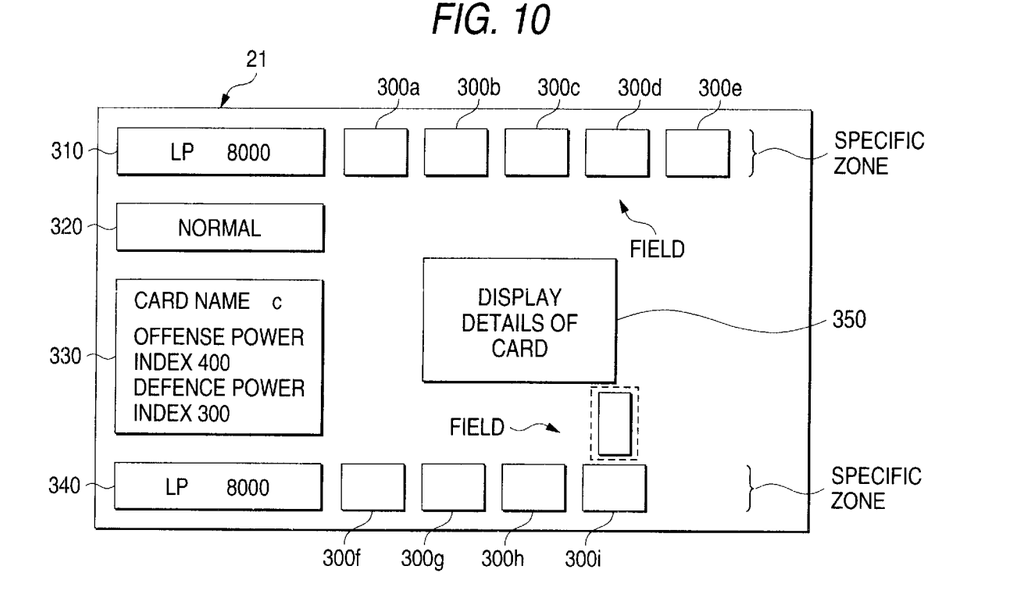
FIG. 10 is a descriptive view showing an example of a display screen appearing in a display area 21 on a display section 20.
Figure 11:
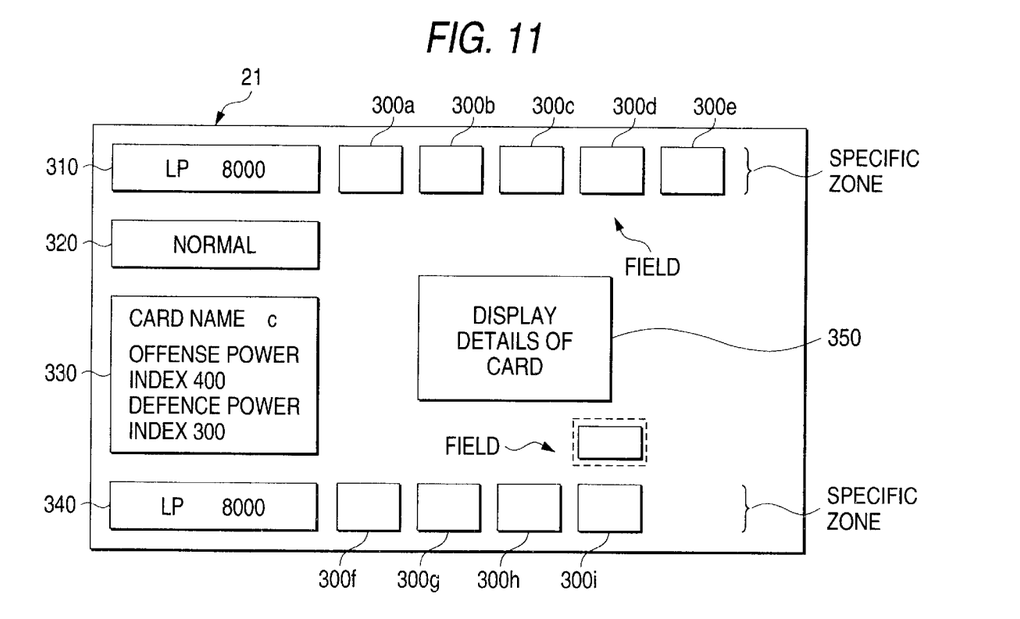
FIG. 11 is a descriptive view showing an example of a display screen appearing in a display area 21 on a display section 20.

When it is determined that "Offense" has been selected in the state shown in FIG. 8 by actuation of the control button 10 (YES is selected in step S1000 shown in FIG. 9), processing proceeds to step S1010, where an offense display is provided. Otherwise (i.e., NO is selected in step S1000), processing proceeds to step S1020. As shown in FIG. 10, the CPU 30 displays the card for which "Offense" has been selected in a vertically-oriented manner in the field, by enclosing the hand with dotted lines so as to make the card conspicuous, thereby effecting an offense display. In contrast, when it is determined that "Defense" has been selected by actuation of the control button 10 (YES is selected in step S1020), processing proceeds to step S1030, thus effecting a defense display. Otherwise (i.e., when NO is selected in step S1020), processing is terminated. As shown in FIG. 11, the CPU 30 displays the card for which "Defense" has been selected, in a horizontally-oriented manner in the field, by enclosing the card with dotted lines so as to make the card conspicuous, thereby effecting a defense display.

In the statuses shown in FIGS. 10 and 11, only one card is laid in the field. There may be a case where a plurality of cards or no cards are laid in the field. For example, if the player or the opponent continues selecting only "Defense," the number of cards displayed in the field increases continuously. Alternatively, even when either of the players continuously scores a win, the number of cards laid in the field increases. In any event, when one or more cards are displayed in the field, the player can select either "Offense" or "Defense" for each of the cards.

Figure 12:
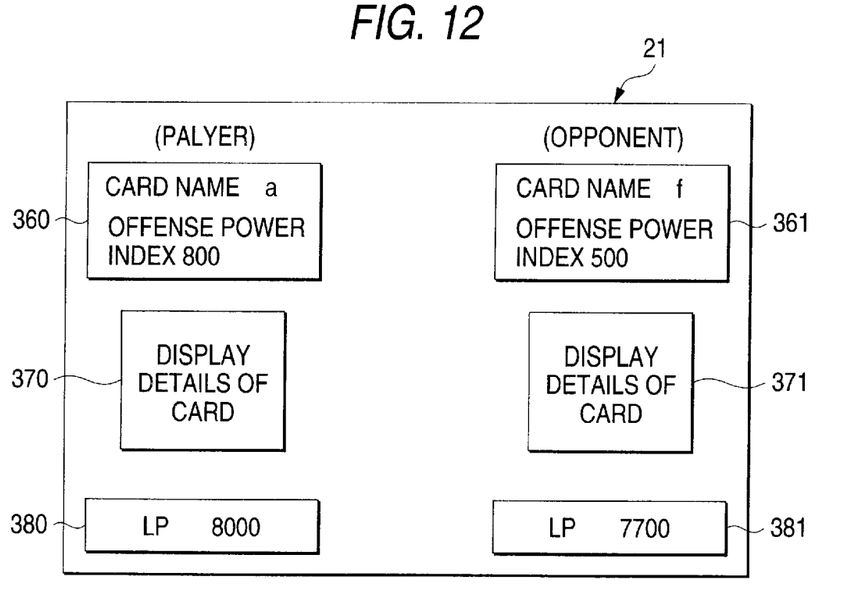
FIG. 12 is a descriptive view showing an example of a display screen appearing in a display area 21 on a display section 20.

If the opponent also lays a card in the field in the statuses shown in FIGS. 10 and 11 and if either the player or the opponent selects "Offense," the CPU 30 displays the name and power index of the player's card in an area 360 and the name and power index of the opponent's card in an area 361, as shown in FIG. 12. The image information items pertaining to the cards are displayed in areas 370 and 371. Further, life points assigned to the player are displayed in an area 380, and life points assigned to the opponent are displayed in an area 381, thus causing the player and the opponent to enter battle. A winner and a loser are determined in accordance with the power indices. After completion of the battle, the CPU 30 provides a display shown in FIG. 10, thereby leaving the winner's card in the field while remaining faceup. In contrast, the loser's card is caused to disappear from the display area 21. An object of offense can be arbitrarily selected from the cards arranged in the field of the other.

After completion of one battle, the CPU 30 replenishes hands by selection of cards from the deck region 52 such that five cards become available. Through continuous execution of these operations, the CPU 30 displays the player who has lost all his life points as a loser and the remaining player as a winner (not shown).

Figure 13:
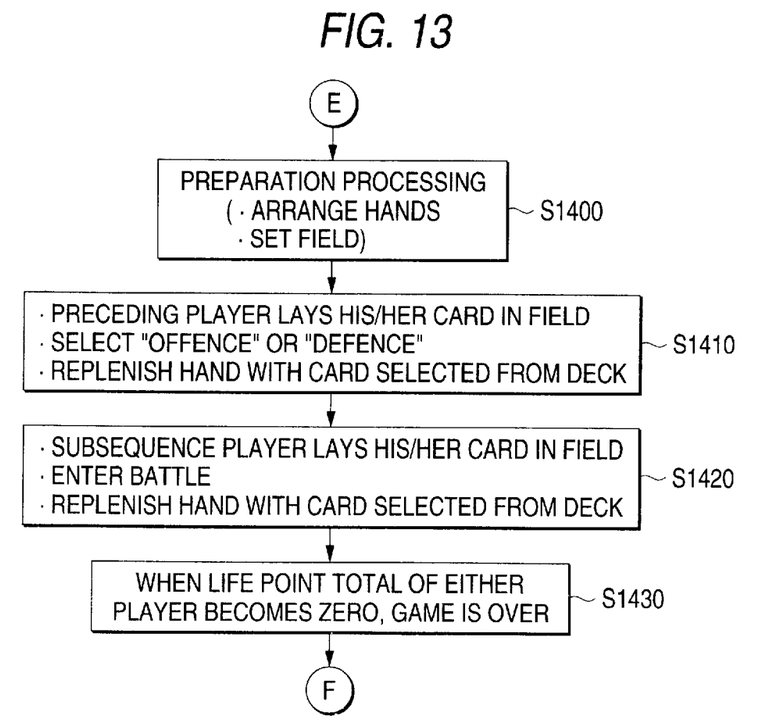
FIG. 13 is a flowchart for describing the operation of the game machine according to the embodiment.

The game of this type is explained in more detail with reference to a flowchart. The following description is given on the assumption that the player plays a game against a game machine (also called an "opponent") and that either side has completed establishment of a deck. The CPU 30 arbitrary selects five cards from the deck region 52 of the player and from the deck region 52 of the opponent. Further, a field is determined by lottery (step S1400 shown in FIG. 13).

After having determined either the player or the opponent as one who makes the first move in a game first (a preceding player) and the remaining as one who makes the second move (a subsequent player), the preceding player lays one card from his hand in the field. The preceding player selects either "Offense" or "Defense" in connection with the thus-selected card. Moreover, when "Offense" has been selected, the CPU 30 displays the card in a vertically-oriented manner as shown in FIG. 10. When "Defense" has been selected, the CPU 30 displays the card in a horizontally-oriented manner as shown in FIG. 11. Since the preceding player has laid one card in the field, the hand of the preceding player is replenished with a card selected from the deck region 52 such that five cards are available (step S1410).

As in the case of the preceding player, the subsequent player lays one card from his hand into the field. Now, a battle between the preceding and subsequent players is commenced. After completion of the battle, the hand of the subsequent player is replenished with a card selected from the deck region 52 such that five cards are available (step S1420). As described in connection with step S1430, the battle is continued until one of the players loses all his life points (i.e., has a life point total of 0).

Figure 14:
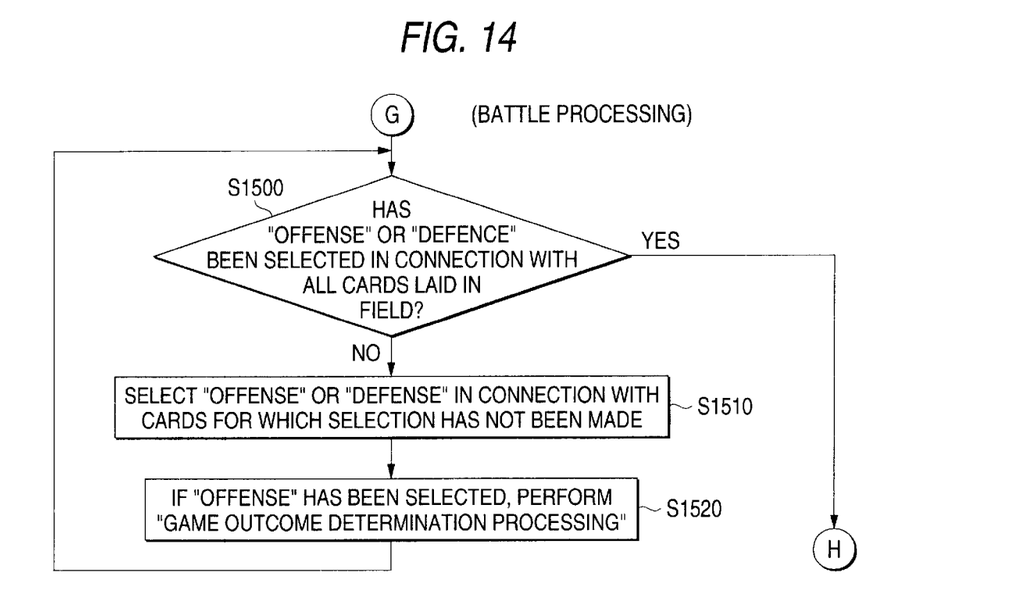
FIG. 14 is a flowchart for describing the operation of the game machine according to the embodiment.

The battle pertaining to step S1420 is processed in such a manner as shown in FIG. 14. When "Offense" or "Defense" has been selected for all the cards laid in the field in step S1500 (YES is selected in step S1500), the CPU 30 terminates processing. Processing returns to step S1420, and cards are alternately laid down in the field. Otherwise, processing proceeds to step S1510. Next, either "Offense" or "Defense" is selected in connection with a card of the preceding or subsequent player (step S1510). When "Offense" is selected, the CPU 30 determines a winner and a loser (step S1520). When neither side has selected "Offense," processing proceeds to step S1500. When "Offense" or "Defense" has been selected in connection with all the cards laid in the field (YES is selected in step S1500), a battle is over.

Figure 15:
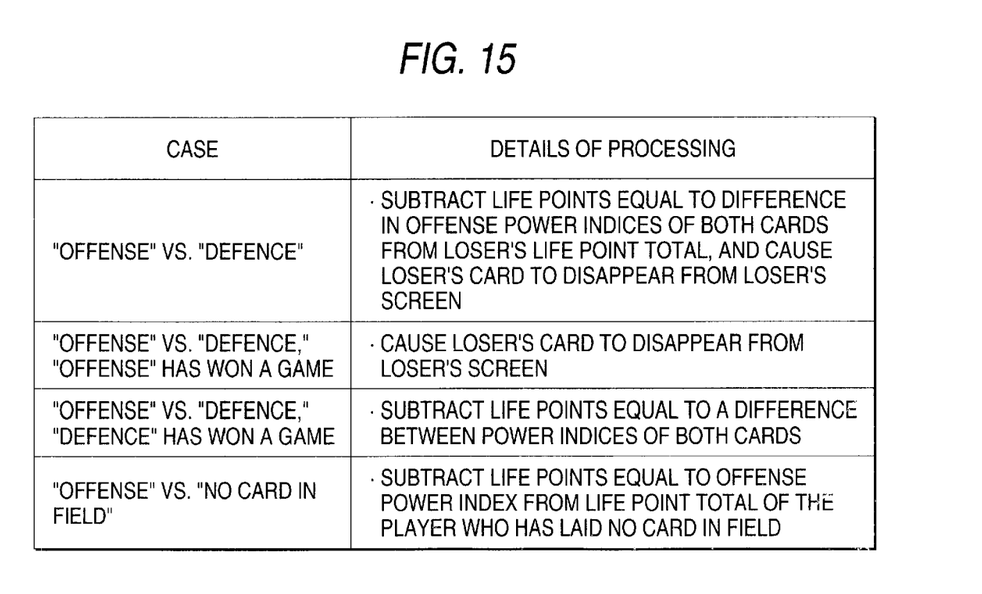
FIG. 15 is a descriptive view for describing a winning/losing determination processing.

FIG. 15 is a table for describing determination of a winner and a loser performed by the CPU 30. If "Offense" and "Offense" have been selected, the number of life points equal to a difference between the offense power indices of both cards is subtracted from the life point total of the loser, and the loser's card is caused to disappear from the display area 21. In the case of "Offense" and "Defense" having been selected, if "Offense" has won the battle (i.e., the offense power index exceeds the defense power index), the loser's card is caused to disappear from the display area 21. In contrast, if "Defense" has won the battle (i.e., the defense power index exceeds the offense power index), the number of life points equal to a difference between the power indices of both cards is subtracted from the life point total of the loser. If "Attack" and "No card in field" have been selected, the number of life points corresponding to the offense power index are subtracted from the life point total of the player who has laid no card in the field.

When one of the players has lost all his life points (i.e., has a life point total of 0) after having continued battles in the manner as mentioned above, the player is determined to be a loser, and the other player is determined to be a winner. Thus, a round of card games is completed.

3. Principal Feature of the Present Invention

The principal feature of the present invention next will be described. As has been described previously, when the cassette 200 is attached to the game machine 100, an electrical connection is established between the CPU 30 and the connector 70, and a player has issued a reset instruction or turned on power by actuation of the control button 10, the CPU 30 performs operations in accordance with the basic software recorded in the ROM 40. The CPU 30 loads the operation control program 201 from the cassette 200 and de-archives the program 201 into the RAM 30. Simultaneously, the CPU 30 loads card numbers, card names, image information items, and fields, which pertain to 1000 cards, from the data table 202 described with reference to FIG. 3, and stores the thus-loaded information into the baggage region 51.

Next, card information is automatically read from the baggage region 51, by an operation instruction entered by the player by way of the operation button 10 or in accordance with a predetermined procedure. Card information items pertaining to 600 cards are stored in the deck region 52. At this time, the CPU 30 loads only a card information item(s) for which loading is allowed by a read enable flag of the data table 202 (i.e., a read enable flag of 1). The thus-loaded card information item/items is/are stored in the deck region 52. In other words, the CPU 30 does not load a card information item/items which is/are assigned a read enable flag of 0 and for which loading has not been allowed and does not store the information items into the deck region 52.

The CPU 30 loads card information items recorded in the cassette 200 into the baggage region 51. Next, the CPU 30 loads, into the deck region 52 for storing card information items capable of being laid on the game screen, only the card information item(s) assigned a read enable flag of 1 from among the card information items loaded into the baggage region 51. From among the card information items recorded in the cassette 200, only the card information item/items for which reading has been allowed is/are loaded into the deck region 52 and can be used for a game. As a result thereof, the player plays a game through use of a limited number of available card information item(s) as compared with the case of a game according to the related art. Correspondingly, the player can enjoy playing a game without feeling monotony. The number of read enable flags set to 1 is usually set to the largest number of cards which can be stored in the deck region 52, or may be set to a number exceeding the largest number.

Figure 17:
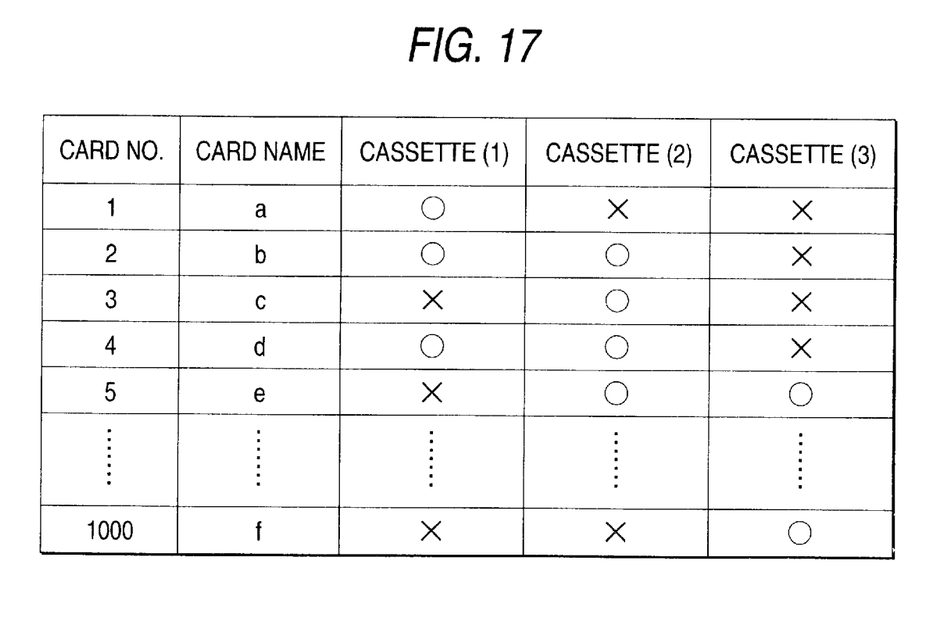
FIG. 17 is a descriptive view for describing the principal part of the present invention.

Further, the read enable flag information is recorded In the cassette 200 as the data table 202. Hence, setting of the read enable flag information is easy. FIG. 17 shows an example of three types of cassettes (1), (2), and (3). In connection with card information items recorded in these cassettes, card information items which can be loaded into the deck region 52 are assigned "O," and the remaining card information items are assigned "X." Card information items pertaining to card numbers "1," "2," and "4" can be loaded from the cassette (1). However, card information items pertaining to card numbers "3" and "5" cannot be loaded from the cassette (1).

Card information items pertaining to card numbers "2," "3," "4," and "5" can be loaded from the cassette (2). However, card information items pertaining to card number "1" cannot be loaded from the cassette (2). Card information items pertaining to card number "5" can be loaded from the cassette (3). However, card information items pertaining to card numbers "1," "2," "3," and "4" cannot be loaded from the cassette (3). In this case, the player can play a game with a renewed feeling, through use of either a cassette (2) or a cassette (3), which enables loading of card information items which cannot be loaded from the cassette (1).

Thus, so long as read enable flags differ from one cassette to another cassette, among a plurality of cassettes based on the same standard, a player can play a game while available card information items vary among a plurality of cassettes. Consequently, the player can enjoy playing a game without feeling monotony.

4. Additional Embodiment

The present embodiment is characterized in that a plurality of patterns of read enable flags are set in connection with a plurality of cards and that any one of the patterns is selectively loaded.

Figure 18:
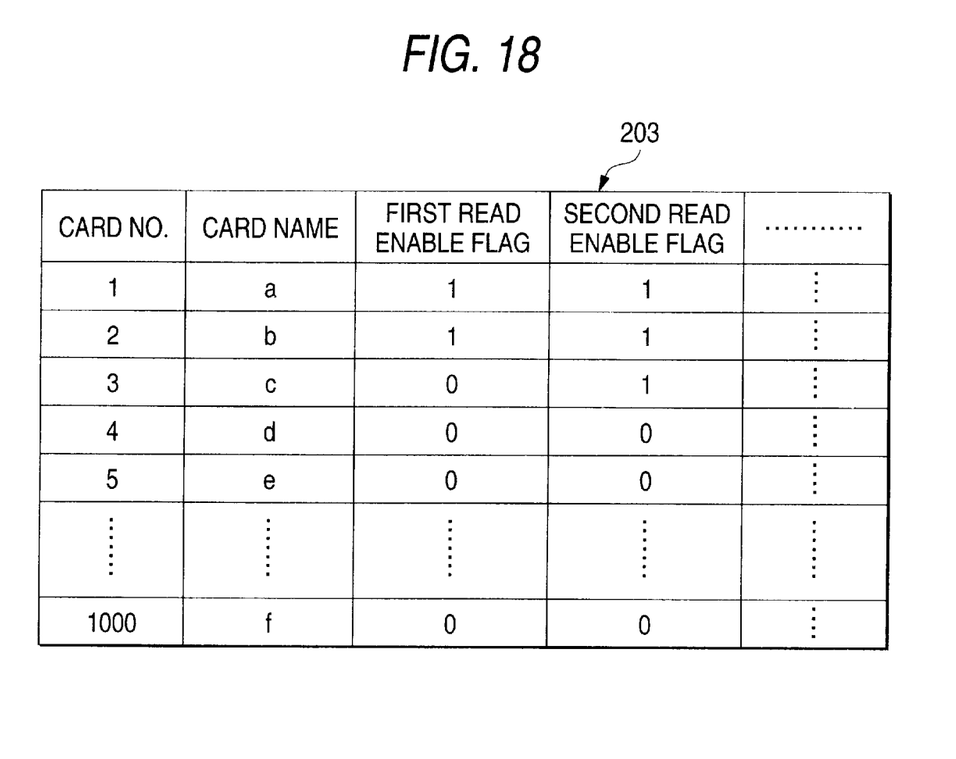
FIG. 18 is a descriptive view of a data table 203.

FIG. 18 shows a data table 203 based on the data table 202 shown in FIG. 3 (power indices in fields are omitted from the table). In the data table 203, first read enable flags and second read enable flags are stored in association with each other. Here, the first read enable flags and the second read enable flags are set so as to differ from each other.

Figure 16:
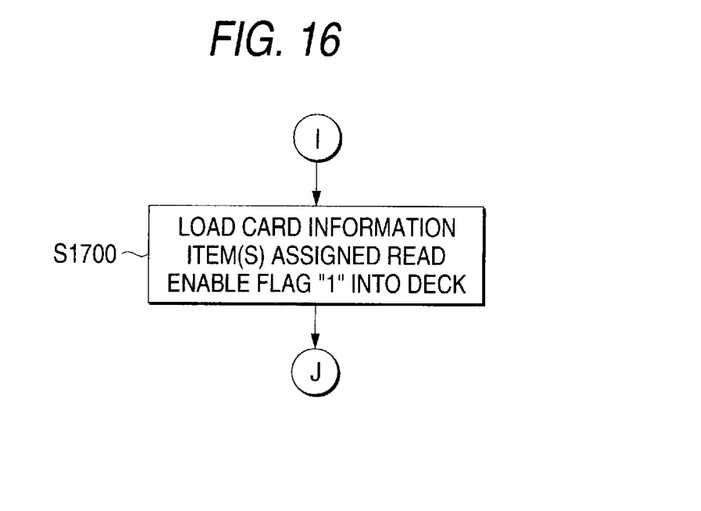
FIG. 16 is a flowchart for describing the operation of a principal part of the game machine according to the embodiment.

Immediately after commencement of a game, the CPU 30 automatically reads card information items from the baggage region 51 in accordance with an operation instruction entered by the player through use of the control button 10 or predetermined procedures. Six hundred card information items are stored in the deck region 52. As described in connection with step S1700 shown in FIG. 16, the CPU 30 loads only card information items for which loading is allowed by the first read enable flag (i.e., a first read enable flag of 1). The thus-loaded card information items are stored in the deck region 52. Consequently, in the data table 203 shown in FIG. 18, the card information items pertaining to card numbers "1" and "2" are stored in the deck region 52.

Figure 19:
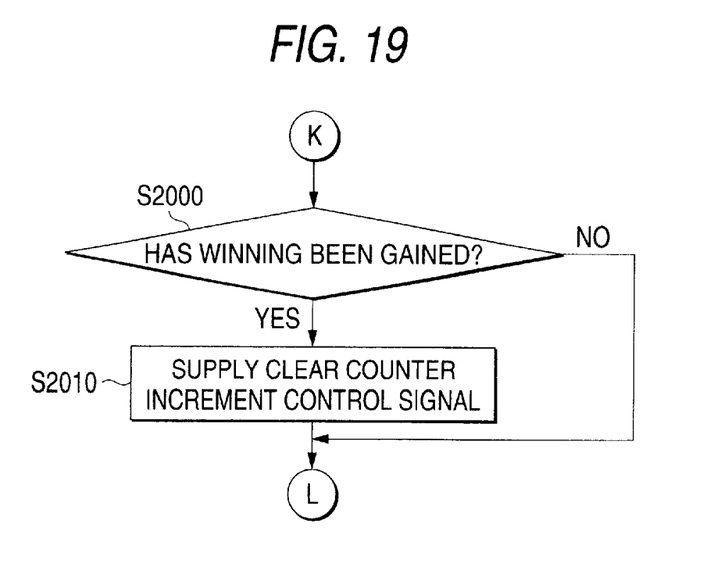
FIG. 19 is a flowchart for describing the operation of a game machine according to another embodiment of the present invention.

When the player has won the game as a result of settlement of the game (YES is selected in step S2000 shown in FIG. 19), processing proceeds to step S2010. Otherwise, processing is terminated. In step S2010, the CPU 30 supplies to the cassette 200 a control signal for incrementing the counter 213 (having an initial value of 1) of the cassette 200, whereupon the counter 213 is incremented by "2." Next, when a new card game is commenced, the CPU 30 automatically loads card information items from the baggage region 51 in accordance with an operation instruction entered by the player through actuation of the control button 10 or predetermined procedures, whereby card information about 600 cards is stored in the deck region 520. At this time, the CPU 30 reads card information items for which loading is allowed by a second read enable flag (a second read enable flag of 1) assigned to value 2 of the counter 213. As a result, in connection with the data table 203 shown in FIG. 18, in addition to the card information items about card numbers "1" and "2," a card information item about card number 3 can be newly stored in the deck region 52.

Hence, the CPU 30 has set read enable flags in a plurality of patterns in connection with a plurality of cards. With reference to any one of the patterns, card information items for which loading is allowed are loaded into the deck region 520 from among the card information items loaded into the baggage region 51. Even when a certain single cassette 200 is used, a player can play a game with different card information items being available in accordance with a selected pattern, thus enjoying a game without feeling monotony.

Setting is effected such that a different pattern is selected every time a player has gained final winning in one game and such that the number of card information items for which loading is allowed in the thus-selected pattern is increased. Hence, the player becomes enthusiastic about the game such that the number of final wins is increased.

So long as the CPU 30 displays on the display section 20 a pattern selected from the plurality of patterns or informs the player of the result of selection by way of voice, the player can readily ascertain the selected pattern. Although only two patterns of read enable flags are provided in the data table 203 shown in FIG. 18, it goes without saying that read enable flags may be stored in three or more patterns.

Although the embodiments of the present invention have been described, the present invention can be susceptible to various modifications or alterations within the scope of the invention.

As has been described, only card information items for which loading is allowed from among card information items recorded in an external computer readable medium are loaded into a second storage region, and the thus-loaded information items can be used for a game. Thus, a player can play a game with restrictions being imposed on available card information items. Correspondingly, there is yielded an advantage of a player being able to enjoy a game without feeling monotony.

It is contemplated that numerous modifications may be made to the game machine, the method of controlling the operation of the game machine, and the recording medium, such as a computer readable medium, having recorded thereon the operation control program for controlling the game machine, of the present invention without departing from the spirit and scope of the invention as defined in the following claims.

What is claimed is:

1. A game machine which enables a player and an opponent to play a match by laying their cards on a game screen, the game machine comprising:
    a first reading device which loads, into a first memory area, card information items pertaining to a plurality of cards recorded in an external computer readable medium; and
    a second reading device which loads, into a second memory area which stores card information items capable of being laid on the game screen, only at least one of the card information items for which loading is allowed from among the card information items loaded into the first memory area.

2. The game machine of claim 1, wherein information concerning the at least one of the card information items for which loading is allowed is recorded in the external computer readable medium.

3. A game machine which enables a player and an opponent to play a match by laying their cards on a game screen, the game machine comprising:
    a first reading device which loads, into a first memory area, card information items pertaining to a plurality of cards recorded in an external computer readable medium; and
    a second reading device which loads, into a second memory area which stores card information items capable of being laid on the game screen, only at least one of the card information items for which loading is allowed from among the card information items loaded into the first memory area,
    wherein information concerning the at least one of the card information items for which loading is allowed is recorded in the external computer readable medium, and,
    wherein the information concerning the at least one of the card information items for which loading is allowed varies among a plurality of external computer readable mediums.

4. The game machine of claim 3, wherein the information concerning the at least one of the card information items for which loading is allowed is set in a plurality of patterns in connection with the plurality of cards within the external computer readable medium, and wherein the second reading device includes a reading section which loads, into a second memory area which stores card information items capable of being laid on the game screen, only the at least one of the card information items for which loading is allowed from among the card information items loaded into the first memory area, with reference to a pattern selected in accordance with a predetermined rule.

5. The game machine of claim 4, wherein the predetermined rule is to select a different pattern every time final winning of a game is achieved.

6. The game machine of claim 5, wherein the pattern employed when a different pattern is selected is set such that the number of at least one of card information items for which loading is allowed increases sequentially.

7. The game machine of claim 6, further comprising a selection pattern output device which outputs a pattern selected from among the plurality of patterns.

8. The game machine of claim 5, further comprising a selection pattern output device which outputs a pattern selected from among the plurality of patterns.

9. The game machine of claim 4, further comprising a selection pattern output device which outputs a pattern selected from among the plurality of patterns.

10. A game machine which enables a player and an opponent to play a match by laying their cards on a game screen, the game machine comprising:
    a first reading device which loads, into a first memory area, card information items pertaining to a plurality of cards recorded in an external computer readable medium; and
    a second reading device which loads, into a second memory area which stores card information items capable of being laid on the game screen, only at least one of the card information items for which loading is allowed from among the card information items loaded into the first memory area,
    wherein information concerning the at least one of the card information items for which loading is allowed is recorded in the external computer readable medium, and
    wherein the information concerning the at least one of the card information items for which loading is allowed is set in a plurality of patterns in connection with the plurality of cards within the external computer readable medium, and wherein the second reading device includes a reading section which loads, into a second memory area which stores card information items capable of being laid on the game screen, only the at least one of the card information items for which loading is allowed from among the card information items loaded into the first memory area, with reference to a pattern selected in accordance with a predetermined rule.

11. The game machine of claim 10, wherein the predetermined rule is to select a different pattern every time final winning of a game is achieved.

12. The game machine of claim 11, wherein the pattern employed when a different pattern is selected is set such that the number of at least one of card information items for which loading is allowed increases sequentially.

13. The game machine of claim 12, further comprising a selection pattern output device which outputs a pattern selected from among the plurality of patterns.

14. The game machine of claim 11, further comprising a selection pattern output device which outputs a pattern selected from among the plurality of patterns.

15. The game machine of claim 10, further comprising a selection pattern output device which outputs a pattern selected from among the plurality of patterns.

16. A method of controlling operation of a game machine which enables a player and an opponent to play a match by laying their cards on a game screen, the method comprising the steps of:
    loading, into a first memory area, card information items pertaining to a plurality of cards recorded in an external computer readable medium; and
    loading, into a second memory area which stores card information items capable of being laid on the game screen, only at least one of the card information items for which loading is allowed, from among the card information items loaded into the first memory area.

17. A method of controlling operation of a game machine which enables a player and an opponent to play a match by laying their cards on a game screen, the method comprising the steps of:
    loading, into a first memory area, card information items pertaining to a plurality of cards recorded in an external computer readable medium;
    loading, into a second memory area which stores card information items capable of being laid on the game screen, only at least one of the card information items for which loading is allowed, from among the card information items loaded into the first memory area
    setting, in a plurality of patterns in connection with the plurality of cards, information concerning the at least one of the card information items for which loading is allowed; and
    with reference to a pattern selected in accordance with a predetermined rule, loading, into a second memory area which stores card information items capable of being laid on the game screen, only the at least one of the card information items for which loading is allowed from among the card information items loaded into the first memory area.

18. A computer readable medium having recorded thereon an operation control program for controlling operation of a game machine which enables a player and an opponent to play a match by laying their cards on a game screen, the operation control program comprising:
    a first processing routine for loading, into a first memory area, card information items pertaining to a plurality of cards recorded in an external computer readable medium; and
    a second processing routine for loading, into a second memory area which stores card information items capable of being laid on the game screen, only at least one of the card information items for which loading is allowed, from among the card information items loaded into the first memory area, and
    a third processing routine for setting, in a plurality of patterns in connection with the plurality of cards, information concerning the at least one of the card information items for which loading is allowed,
    wherein said second processing routine is performed with reference to a pattern selected in accordance with a predetermined rule.

* * * * *